United States Patent [19]
Narita et al.

[11] Patent Number: 5,454,087
[45] Date of Patent: Sep. 26, 1995

[54] BRANCHING SYSTEM FOR RETURN FROM SUBROUTINE USING TARGET ADDRESS IN RETURN BUFFER ACCESSED BASED ON BRANCH TYPE INFORMATION IN BHT

[75] Inventors: Susumu Narita, Kokubunji; Fumio Arakawa, Tokyo; Kunio Uchiyama, Kodaira; Hirokazu Aoki, Hachioji, all of Japan

[73] Assignee: Hitachi, Ltd., Tokyo, Japan

[21] Appl. No.: 965,441

[22] Filed: Oct. 23, 1992

[30] Foreign Application Priority Data

Oct. 28, 1991 [JP] Japan .................................. 3-281030

[51] Int. Cl.$^6$ .................................. G06F 9/42
[52] U.S. Cl. .............. 395/375; 395/800; 395/421.03; 364/255.7; 364/261.4; 364/955.5; 364/938.3; 364/DIG. 1; 364/DIG. 2
[58] Field of Search .................. 395/375, 800, 395/700, 400

[56] References Cited

U.S. PATENT DOCUMENTS

| | | | |
|---|---|---|---|
| 4,488,227 | 12/1984 | Miu et al. | 395/375 |
| 4,831,517 | 5/1989 | Crouse et al. | 395/375 |
| 4,884,244 | 11/1989 | Brewer | 365/240 |
| 4,984,154 | 1/1991 | Hanatami et al. | 395/375 |
| 4,991,080 | 2/1991 | Emma et al. | 395/375 |
| 5,101,341 | 3/1992 | Circello et al. | 395/375 |
| 5,276,882 | 1/1994 | Emma et al. | 395/700 |
| 5,313,634 | 5/1994 | Eickemeyer | 395/700 |

FOREIGN PATENT DOCUMENTS 1-240931 9/1989 Japan.
2-166520 6/1990 Japan.

OTHER PUBLICATIONS

IBM Technical Disclosure Bulletin, "Subroutine call/return stack," vol. 30, No. 11, pp. 221–225, Apr. 1988.

*Primary Examiner*—Ken S. Kim
*Attorney, Agent, or Firm*—Antonelli, Terry, Stout & Kraus

[57] ABSTRACT

An address of a branch instruction, a branch target address thereof, and a type thereof are stored as branch history information in a branch instruction buffer. In addition, a return address for a return from a subroutine is retained in a return buffer. A look-up operation is conducted through the buffer by using the pre-fetch address such that when a hit occurs, a branch target address is output from the buffer depending on a branch instruction type. Consequently, the branch processing is achieved at a high speed. Particularly, the processing speed of an unconditional branch instruction containing a return instruction is increased.

5 Claims, 8 Drawing Sheets

BRANCHING SYSTEM FOR RETURN FROM SUBROUTINE USING TARGET ADDRESS IN RETURN BUFFER ACCESSED BASED ON BRANCH TYPE INFORMATION IN BHT

BACKGROUND OF THE INVENTION

The present invention relates to a data processor having a function to execute a branch instruction and a function to prefetch an instruction, and in particular, to a data processor in which an instruction prefetch function is linked with branch history information to execute a branch instruction at a high speed.

Conventionally, to increase the processing speed of a branch instruction, there has been described in JP-A-1-240931 (laid-open on Sep. 26, 1989) a data processor in which an address of a branch instruction and an address of a branch target instruction are stored as branch history information in a buffer. When an instruction prefetch is achieved, the history information is checked with a prefetch address as a key so that control branches accordingly.

Heretofore, moreover, for a high-speed execution of a branch instruction, there has been described in the JP-A-2-166520 (laid-open on Jun. 27, 1990) a data processor in which an address of an instruction preceding a branch instruction and an address of a branch target instruction are stored as branch history information in a buffer. When the instruction is decoded, the history information is checked with an instruction address thereof as a key to skip execution of an unconditional branch instruction, thereby achieving a branch at a high speed.

The conventional technologies have been devised for primarily increasing the branch processing speed of an unconditional branch instruction. However, it has been clarified through study by the inventors of the present invention that these technologies cannot cope with the branch processing of a return (rts) instruction for a return from a subroutine in association with the unconditional branch instruction for the following reasons.

In each of the prior technologies, assuming that each branch instruction has a fixed branch target address in any case, it is considered that the branch history information is useful for the subsequent branch processing. However, the assumption is not applicable to the case of the return instruction from a subroutine. Since the return instruction is used to return control from the subroutine to a return address of the call side, the return address varies depending on the address of the call side.

The following shows the subroutine call and the return processing mechanism.

First, the routine on the call side executes a subroutine call (bsr) instruction. In the execution, a return address is calculated to be stored in a last-in first-out (LIFO) queue called a stack (generated by the software) in the memory. The return address is calculated by using the address of the subroutine call instruction. Control is then transferred by the instruction to the subroutine. The subroutine is then executed. In the final step of the subroutine, a return instruction is effected. The return address is read from the stack and then control is passed to the return address, thereby transferring the processing to the routine on the call side.

As set forth above, the return address is decided by the address of in the subroutine call instruction. Consequently, when a plurality of subroutine call instructions are included in the program, it is impossible to uniquely determine a return address for the return (rts) instruction written in the associated subroutine.

SUMMARY OF THE INVENTION

It is therefore an object of the present invention to provide a data processor in which a branch instruction can be executed at a high speed and which is capable of coping with branch processing of a type of unconditional branch instruction, namely, a return instruction.

To achieve the object above, there is provided according to an aspect of the present invention a data processor including (1) a first buffer for storing therein branch history information indicating an address of a branch instruction once executed by the data processor, a branch target address thereof, and a type thereof, and (2) a second buffer for storing therein a return address for a return from a subroutine.

Regarding the first buffer, when the data processor executes a branch instruction, which has been executed by the data processor, the branch target address is read from the first buffer to generate a prefetch address of the subsequent instruction at a high speed.

Regarding the second buffer, when the data processor executes a return instruction executed in advance, the return address for a return from the associated subroutine is read from the second buffer, thereby returning control to the routine on the call side at a high speed. The second buffer for storing the return address is a last-in first-out (LIFO) queue. The queue is accessed only when a subroutine call instruction is executed and it is stopped only when a return instruction is executed. In other words, the second buffer is a cache memory for storing therein a copy of a portion (return address) of the stack on the memory.

The two buffers work as follows for the return instruction. Prefetching of a return instruction is detected by use of the first buffer storing branch history information therein. Namely, as a result of execution of a return instruction, branch history information is registered to the first buffer as in the case of execution of other branch (bra and bsr) instructions. However, for the return instruction, the first buffer is used only for the detection of the prefetch operation thereof. Namely, the field of the branch target address is not utilized. Instead, the branch target address is acquired from the second buffer disposed to store the return address.

In addition, since the return instruction is registered together with another branch instruction in the first buffer in which the same branch history information is stored, information is required to determine which one of the buffers is employed in association with the branch address. In order to solve this problem, in the first buffer, there is stored information (branch instruction type) indicating a type of the branch instruction.

Furthermore, in the look-up operation of the branch history information, as described in the JP-A-2-166520, it is possible to use an address of an instruction preceding a branch instruction. There may exist two or more instructions preceding a branch instruction.

Other objects and features of the present invention will be apparent from the description of the preferred embodiments.

DESCRIPTION OF THE PREFERRED EMBODIMENTS

Figure 1:
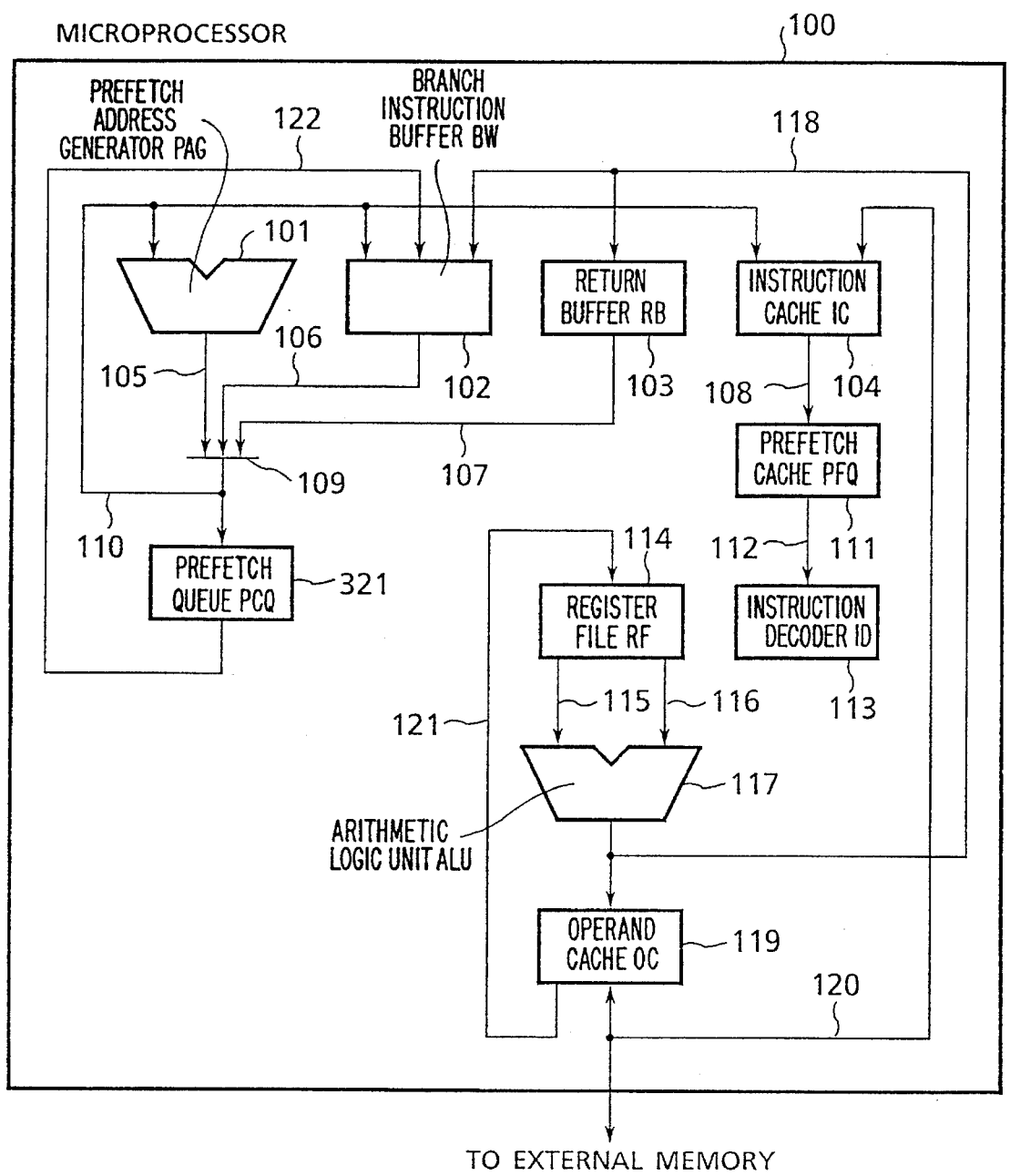
FIG. 1 is a diagram showing the overall constitution of a microprocessor in an embodiment according to the present invention.

FIG. 1 shows in a block diagram the structure of a microprocessor in an embodiment according to the present invention. The present invention is related to a technology for increasing the processing speed of a branch operation related to an instruction prefetch operation and hence the instruction prefetch unit will be primarily described.

1. Internal Configuration of Microprocessor

Referring now to FIG. 1, the internal structure of the microprocessor will be described. In FIG. 1, components and functions of the microprocessor according to the present invention will be abbreviated as follows.

PAG 101: Prefetch address generator (adder).
BW 102: Branch instruction buffer for storing therein branch target addresses.
RB 103: Return buffer for storing therein return addresses.
IC 104: Instruction cache.
PFQ 111: Prefetch queue.
PCQ 321: Instruction address queue for storing therein instruction addresses generated by PAG.
ID 113: Instruction decoder.
RF 114: Register file.
ALU 117: Arithmetic logic unit.
OC 119: Operand cache.

Of these components, PAG, BW, RB, IC, PFQ, and PCQ are included in the prefetch unit. The constituent elements will now be described in the order.

PAG 101 is a 29-bit adder for generating a prefetch address. In sequential execution of a program, namely, other than an operation of a branch, a fixed value is added to a prefetch address each time a prefetch operation is achieved, thereby creating a prefetch address. The fixed value to be added thereto is identical to the byte width of an instruction to be prefetched at a certain time. When the byte-width of the data line between an external memory and the IC (instruction cache) is expressed as eight bytes, the adding value is eight. One of the inputs to the PAG 101, delivered by signal line 110, is the value of the prefetch address. The other input thereof is the fixed value, which is eight in this example (the value "8" can be represented by a carry bit to the least-significant bit (LSB)). A result of the addition is supplied onto a signal line 105.

In the branch instruction buffer BW 102, there is stored branch instruction history including an address of a branch instruction, a branch target address thereof, and a type thereof. These items are arranged in a group as history information. In an instruction prefetch operation, a prefetch address is compared with a branch instruction address in the history information. If a hit occurs, the branch target address and the branch instruction type are output from BW 102.

The return buffer RB 103 is a last-in first-out (LIFO) queue for storing therein a return address for a return instruction which is a type of branch instruction.

The instruction cache IC 104 receives as an input thereto a 29-bit prefetch address via the signal line 110 and then reads a 64-bit instruction (4 instructions with 16 bit-width) associated with the address of the cache 104 to output the instruction onto a signal line 108. When the instruction is missing at the address of the cache 104, an external memory access is initiated such that an instruction is read from an external memory via a 64-bit signal line 120 to be written into the cache 104.

The prefetch queue PFQ 111 is a first-in first-out (FIFO) queue for storing therein prefetched instructions and has a function of arranging an instruction (for example, from a 64-bit format into a 16-bit format). The queue PFQ 111 receives the 64-bit signal line 108 as an input thereto and delivers an output to a 16-bit signal line 112.

The instruction address queue PCQ 321 is an FIFO queue for keeping therein prefetch addresses produced by the generator PAG 101. The queue 321 receives, as an input thereto, a 29-bit output signal 110 from a three-input selector 109 and sends an output onto a 29-bit signal line 122.

The instruction decoder ID 113 receives as an input thereto an instruction from the queue PFQ 111 via the 16-bit signal line 112. Each instruction supplied thereto is in the arranged or aligned format in a 16-bit unit. A result of the instruction decoding operation is fed to related components via control lines. The control lines are however not shown in FIG. 1.

The register file RF 114 of this embodiment includes 16 registers each being 32 bits wide. The RF 114 has one input port and two output ports. These input and output ports can be operated simultaneously. The ports are each 32 bits wide and are connected to signal lines 121, 115, and 116, respectively.

The 32-bit signal lines 115 and 116 are connected as inputs to an arithmetic logic unit (ALU) 117. The ALU 117 outputs a computation result onto a line 118. In this embodiment, the data operation and the address calculation are both conducted by the ALU 117. The obtained data or address is output to the signal line 118.

The operand cache OC 119 is accessed, when an operand is to be fetched, according to an address input via the signal line 118 such that resultant data is delivered onto a signal line 121, thereby transferring a value thereof to the register file 114. In an operand storing operation, a storing address is transferred in the first cycle from the ALU 117 via the signal line 118 to the operand cache 119 to be stored therein. In the subsequent cycle, storage data is transferred via the signal line to conduct the operand storing operation in the operand cache 119 and the external memory. In addition, when the data accessed through the operand fetch operation is missing in the operand cache 119, the external memory access is activated to transfer an operand from the external memory to the operand cache 119 via a signal line 120.

2. Flow of Pipeline Processing

Referring to FIGS. 2 to 6, description will be given of the pipeline processing flow in the microprocessor of the embodiment shown in FIG. 1.

2.1 Pipeline Processing Flow Without Branch

Figure 2:
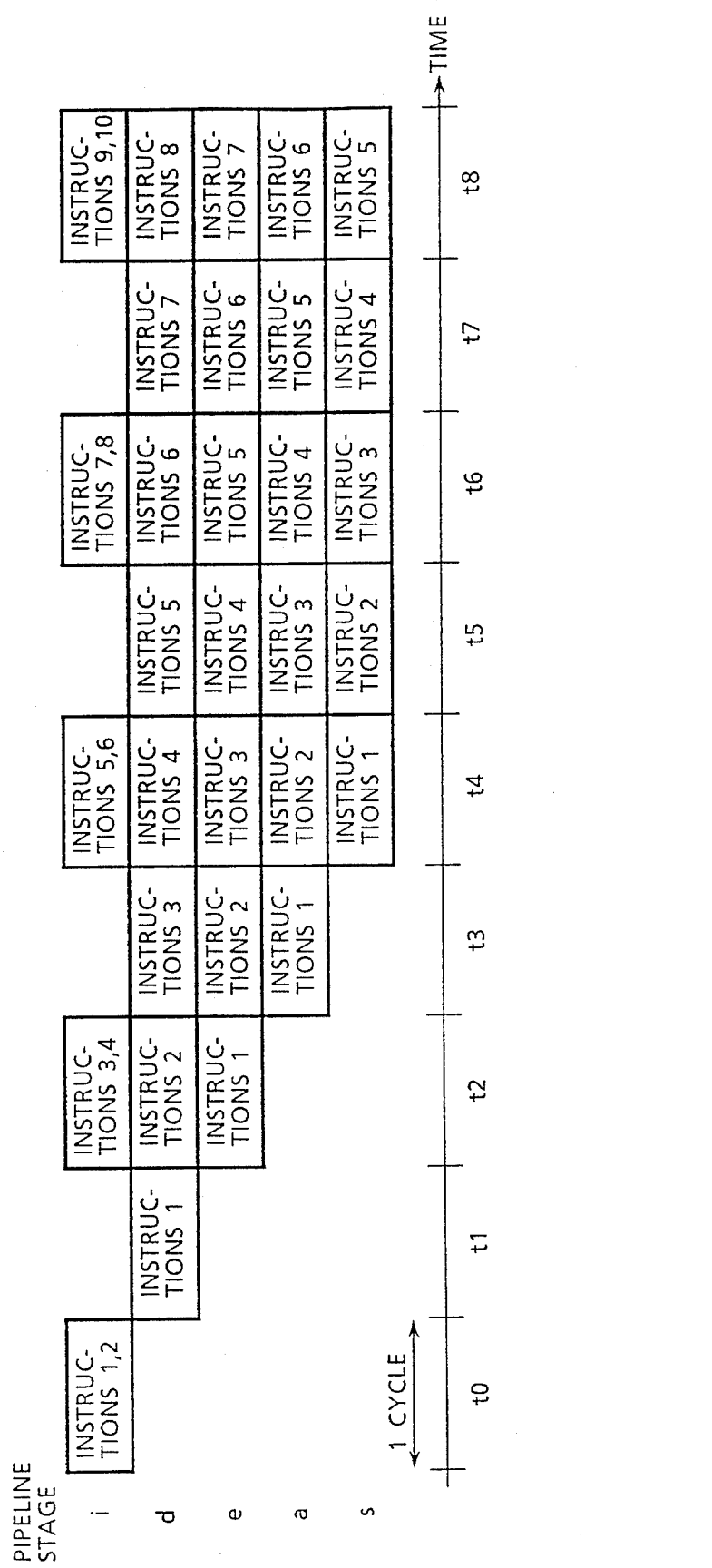
FIG. 2 is a diagram showing the pipeline processing flow when no branch operation exists in the microprocessor of FIG. 1.

FIG. 2 shows a flow of the pipeline processing when there is no execution of a branch operation. The abscissa stands for time and the respective cycles are denoted as t0, t1, etc., whereas the ordinate designates processing in each stage of the pipeline.

A stage "i" is an instruction prefetch stage including the operations of PAG 101, BW 102, RB 103, IC 104, PFQ 111, and PCQ 321. For example, at time t0 in FIG. 2, an instruction 1 is prefetched to be transferred from PFQ 111 via the signal line 112 to the subsequent processing stage (instruction decoding operation). In this regard, it is assumed in FIG. 2 that the instructions are prefetched only from the instruction cache 104.

A stage "d" is an instruction decoding stage and contains the operations of ID 113 and RF 114 of FIG. 1. At time t1 of FIG. 2, the instruction 1 is decoded by the decoder 113 such that, based on a result of the decoding operation, the register file 114 is accessed to read data therefrom. The obtained data is transmitted to the signal lines 115 and 116.

A stage "e" is an execution and address calculation stage and includes operations of the ALU 117 of FIG. 1. At time t2 of FIG. 2, the instruction 1 is executed by the ALU 117 under control of the instruction decoder 113, thereby achieving the data operation. The signal lines 115 and 116 are connected as inputs to the ALU 117 and the result is output to the signal line 118.

A stage "a" is an operand access stage and contains operations of the operand cache 119. At time t3 of FIG. 2, the instruction 1 achieves an operand access processing under control of the instruction decoder 113. Three kinds of processing are executed as follows.

(1) Operand fetch: When data to be fetched is missing in the operand cache 119, data is transferred from the external memory to the operand cache 119 so as to execute the operand fetch processing therefrom.

(2) Operand store: Data is stored both in the operand cache 119 and the external memory.

(3) Data transfer: The operation result is transferred from the ALU 117 to the register file 114.

In any of the operations, the inputs are supplied via the signal line 118. In the operations (1) and (3), the outputs are delivered onto the signal line 121. Moreover, data is communicated with the external memory via the signal line 120. The address output line to the external memory is not shown in FIG. 1.

A stage "s" is a register storing stage and includes operations of the register file 114 of FIG. 1. At time t4 of FIG. 2, the instruction 1 conducts a register storing operation under control of the instruction decoder 113. The input signal is delivered via the signal line 121.

2.2 Flow of Pipeline Processing With Branch

Figure 3:
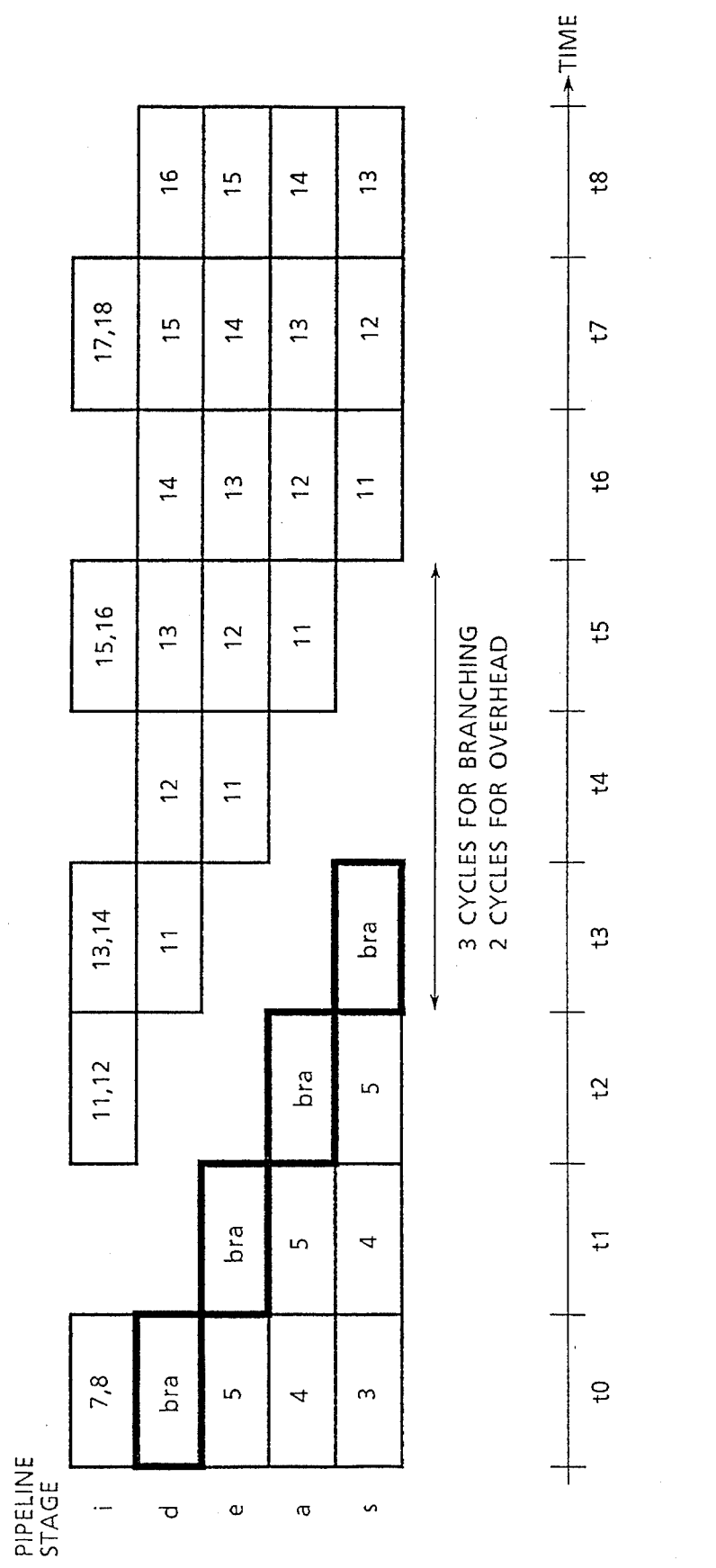
FIG. 3 is a diagram showing the pipeline processing flow when a mis-hit occurs in a branch instruction buffer BW 102 of the microprocessor of FIG. 1.

FIG. 3 shows the pipeline processing flow when, at execution of an unconditional branch (bra) instruction, a miss occurs in the branch instruction buffer BW 102. The fact that the instruction under execution is an unconditional branch instruction is determined when the instruction decode stage "d" is finished for the instruction, i.e., at a time t0. However, the branch target address is known when the address calculation stage "e" is completed, namely, at time t1. Consequently, instructions 11 and 12 at the branch target address are prefetched at time t2. As a result, there occurs a two-cycle overhead (idle time of the pipeline processing) per branch.

Figure 4:
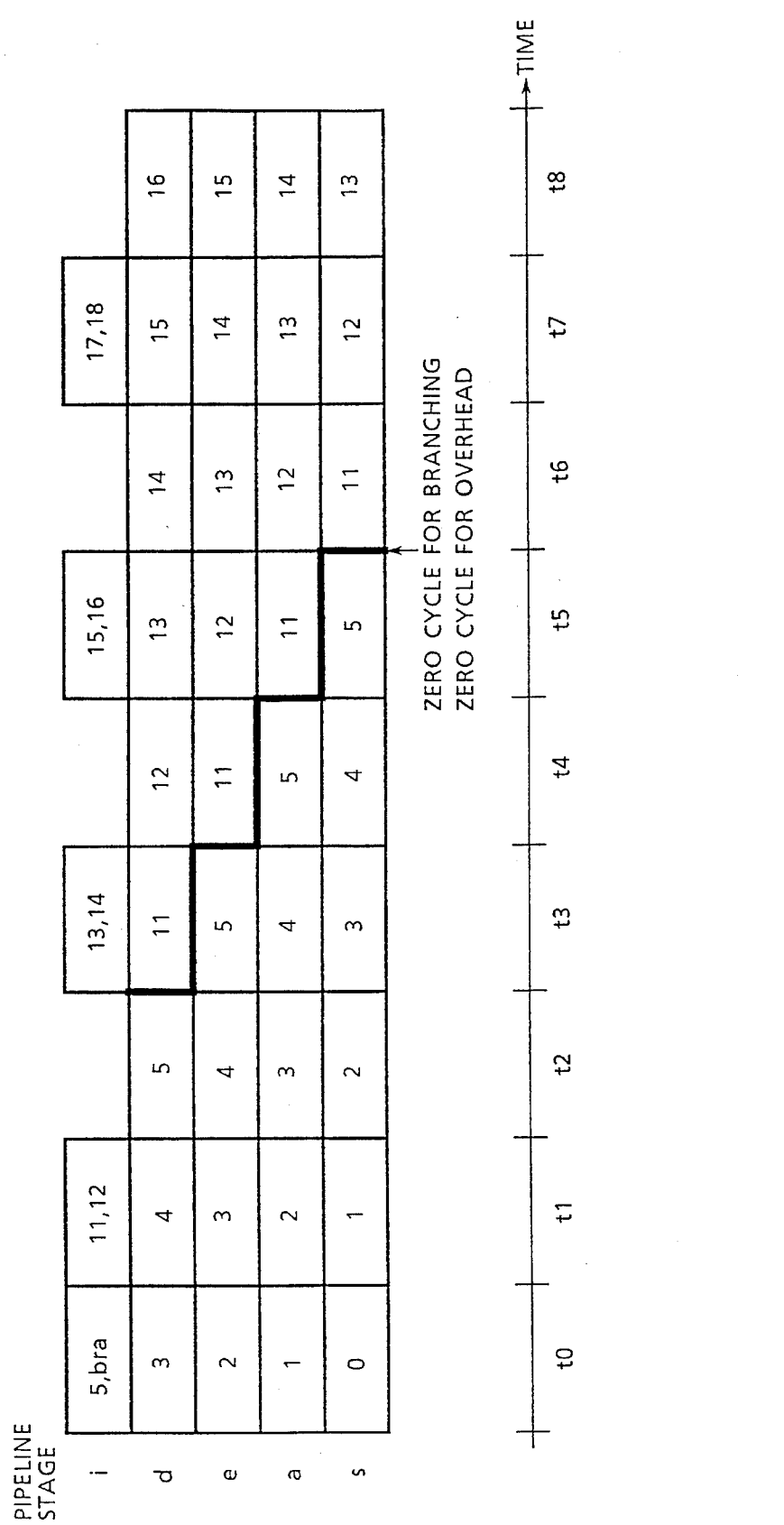
FIG. 4 is a diagram schematically showing the pipeline processing flow when a hit occurs in the branch instruction buffer BW 102 of the microprocessor of FIG. 1.

FIG. 4 shows the pipeline processing flow when the branch processing of the unconditional branch instruction is executed at a higher speed by use of the buffer BW 102 of FIG. 1. Namely, this diagram shows the pipeline processing flow when a hit occurs in the buffer 102. In FIG. 4, as compared with FIG. 3, the overhead does not take place (0 cycle) as follows. In the stage "i" at time t0, the fact that the instruction is prefetched is detected from history information of the buffer 102 such that the branch target instruction 11 is already prefetched at time t1. Moreover, since the processing of the instruction includes only the branch processing, the bra instruction itself is deleted or skipped in the stage "i" and hence is not transferred to the stage "d".

Figure 5:
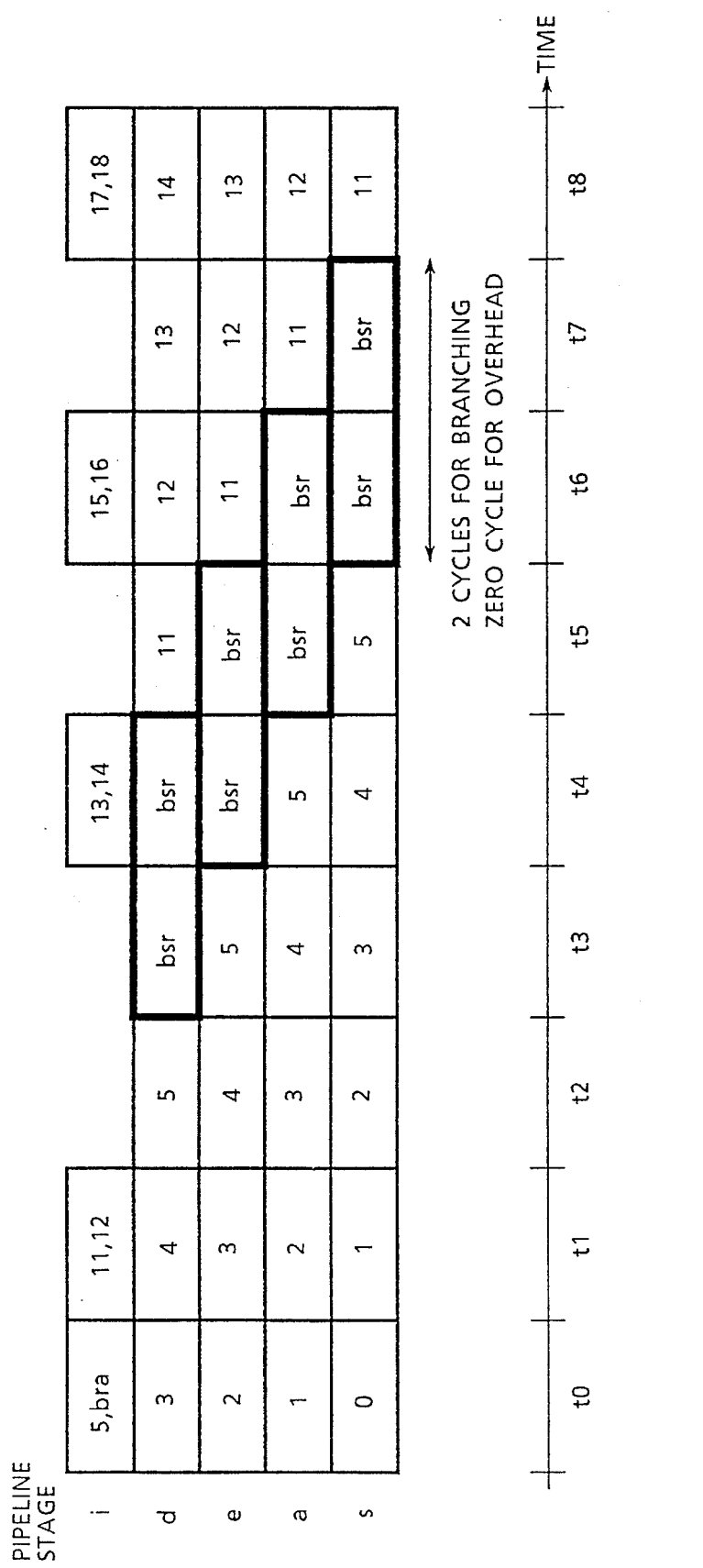
FIG. 5 is a diagram showing the pipeline processing flow when a hit occurs in the branch instruction buffer BW 102 of the microprocessor of FIG. 1.

FIG. 5 shows, like FIG. 4, an example in which the branch processing speed is increased by the buffer 102 of FIG. 1. However, the branch instruction is a subroutine call (bsr) instruction. When the instruction is executed, instructions 11 and 12 of the subroutine are read from the branch instruction buffer 102. Incidentally, this (bsr) instruction to call a subroutine is different from the branch (bra) instruction for an unconditional branch. Namely, there exists processing to be executed in addition to the branch processing and hence the instruction cannot be skipped, unlike in the case of the branch (bra) instruction as above. Consequently, a two-cycle period of time is required to execute the branch. The overhead of the branch is 0 cycle like in the case of FIG. 4.

Figure 6:
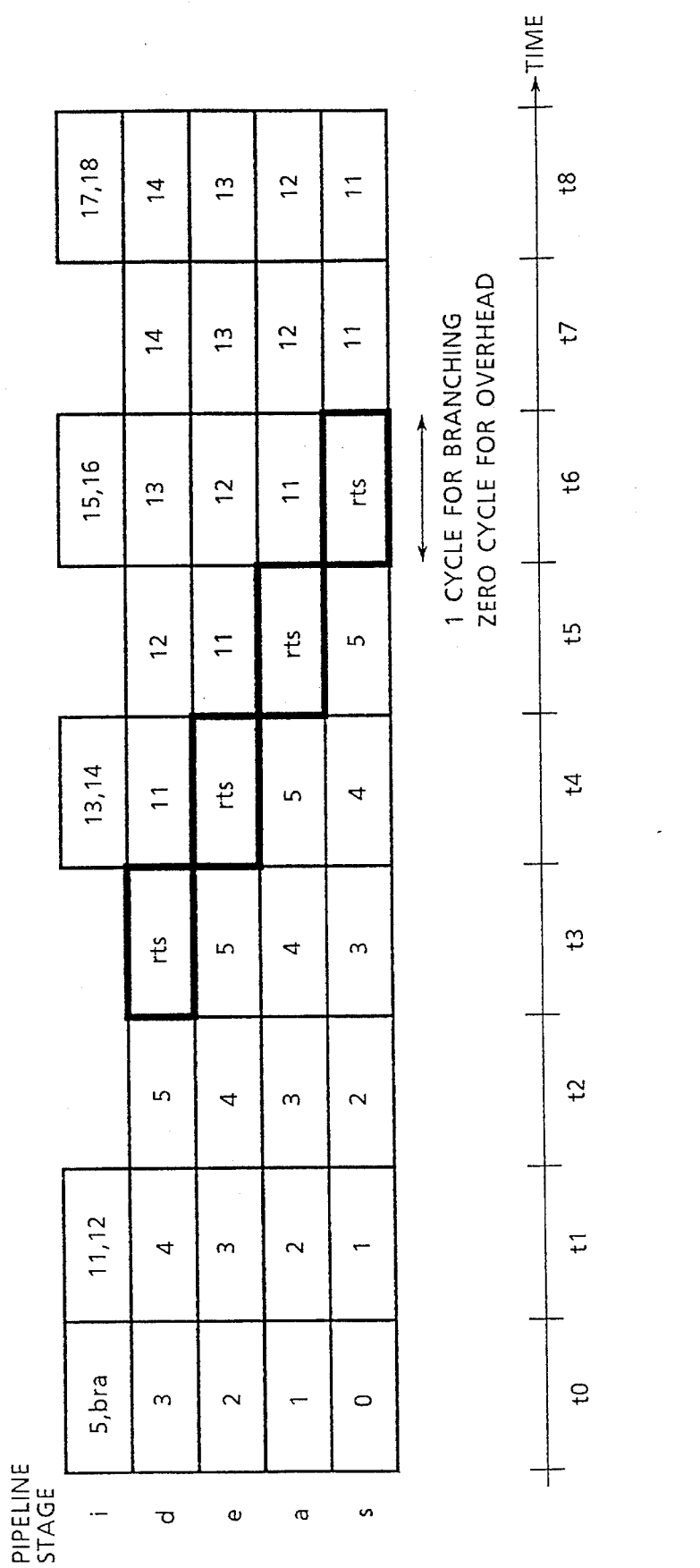
FIG. 6 is a diagram illustratively showing the pipeline processing flow when a hit occurs in the branch instruction buffer BW 102 and a return buffer RB 103 of the microprocessor of FIG. 1.

FIG. 6 shows, like FIG. 4, an example in which the branch processing speed is increased by using the buffer 102. In this example, however, the branch instruction is a return (rts) instruction. When this instruction is executed, an address of the routine on the call side is read from the return buffer 103. This instruction cannot be skipped for the same reason as for the subroutine call (bsr) instruction. Consequently, a cycle is required to execute the instruction. However, thanks to the advantageous effect of the buffer 102, the overhead associated with this instruction is 0 cycle.

As described above, the unconditional branch (bra) instruction and the subroutine call (bsr) instruction are processed via the branch instruction buffer BW 102 without using the return buffer RB 103. On the other hand, the return (rts) instruction is executed via the buffers 102 and 103. Prior to an explanation of the operation flow, the constitution of these buffers 102 and 103 will be described.

3. Configuration and Operation of Branch Instruction Buffer 102 and Return Buffer 103

3.1 Configuration and Operation of Branch Instruction Buffer 102

Figure 7:
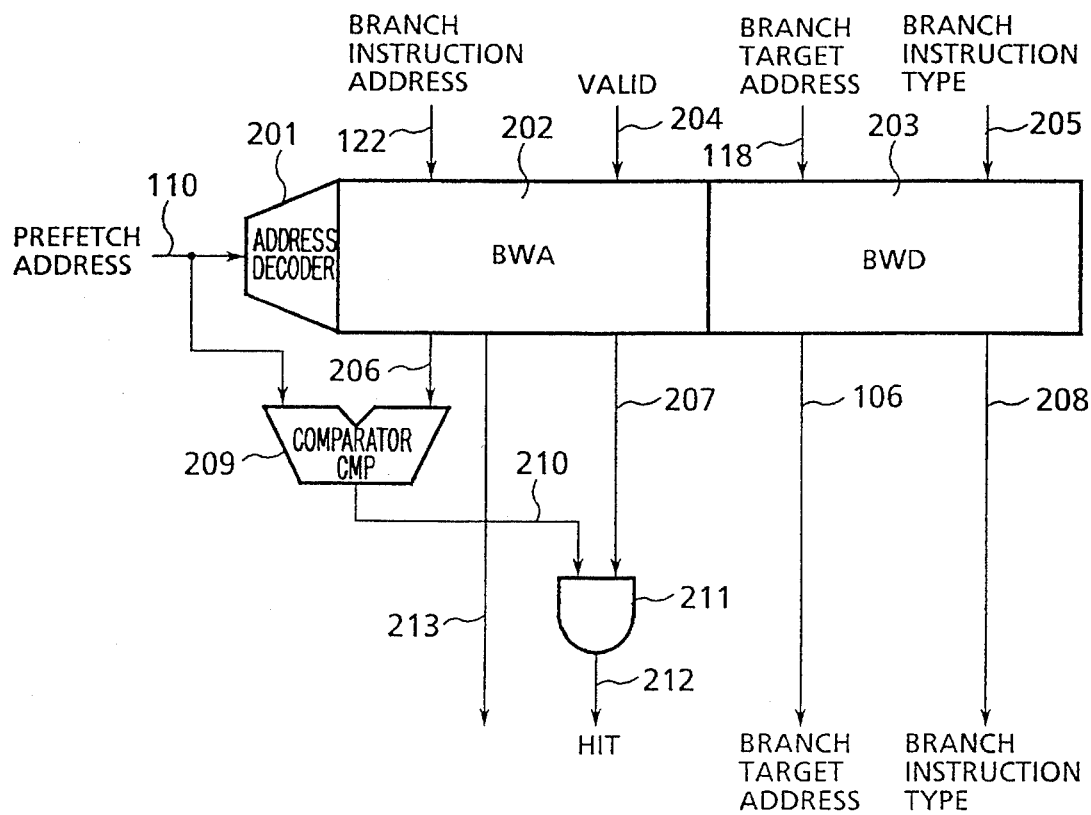
FIG. 7 is a schematic diagram showing in detail the configuration of the branch instruction buffer BW 102 in the microprocessor of FIG. 1.

FIG. 7 is a configuration diagram for explaining in detail the structure of the buffer 102 of FIG. 1. The buffer 102 includes an address decoder 201, an address tag field BWA 202, a data field BWD 203, and a matching comparator CMP 209.

The address decoder 201 is a 5-bit decoder to obtain as a result of the decoding operation a pointer specifying one of 32 entries respectively of the BWA 202 and BWD 203. Each field is formed with a random access memory (RAM). This however may be configured with a content addressable memory. The BWA 202 and the BWD 203 have 32 entries or words and 32-bit and 33-bit widths, respectively.

The 32 bits of the BWA 202 include 31 bits for a branch instruction address (an input line 122, output lines 206 and 213) and a bit for a valid bit (an input line 204, an output line 207). The 33 bits of the BWD 203 include 31 bits for a branch target address (an input line 118 and an output line 106) and two bits for a branch instruction type (an input line 205 and an output line 208). The branch instruction type is information for discriminating between the unconditional branch (bra) instruction, the subroutine call (bsr) instruction, and the return (rts) instruction. The CMP 209 is a matching comparator which is 24 bits wide. A signal 210 therefrom indicating a result of the matching comparison (1 for matching and 0 for mis-matching) is ANDed with a valid signal 207 in an AND circuit 211. An output from the AND circuit 211 is delivered as a bit signal 212 to a BW control circuit in the instruction prefetch unit.

The write operation of the branch instruction buffer BW 102 is as follows.

First, five low-order bits of the 29-bit prefetch address signal line 110 are supplied to the address decoder 201. Next, the address is decoded by the decoder 201 to select one of the 32 entries. In this operation, the values of the signal lines 122, 204, 118, and 205, connected as inputs to the BWA 202 and the BWD 203, are simultaneously written in the selected entry at the same time. The branch instruction address 122 is delivered via the output signal line from the instruction address queue PCQ 321 of FIG. 1. The valid bit 204 is sent from the control circuit of the instruction prefetch unit, and the branch target address 118 is delivered via the output signal line (resultant from the address calculation) from the ALU 117 of FIG. 1. The branch instruction type 205 is denoted by a signal obtained by achieving a timing adjustment by the control circuit of the instruction prefetch unit on output information from the instruction decoder ID 113.

The read operation of the branch instruction buffer BW 102 is achieved as follows.

As in the write operation thereof, five low-order bits of the 29-bit prefetch address signal line 110 are fed to the address decoder 201, whereas 24 remaining bits are supplied to the matching comparator CMP 209. Subsequently, the address is decoded in the address decoder 201 to select one of the 32 entries. The BWA 202 and the BWD 203 are accessed to read therefrom data of the selected entry, thereby outputting the data onto the signal lines 206, 213, 207, 106, and 208.

The branch instruction address output onto the signal line 206 is 24 high-order bits of the address of the branch instruction registered to the selected entry. Since only the five low-order bits of the address are used to select the entry, in order to determine whether or not the address of the registered branch instruction is equal to that of the branch instruction contained in the instruction being prefetched, the high-order 24 bits are checked between the addresses by the comparator 209.

Seven low-order bits succeeding the 24 bits are sent to the signal line 213. Five high-order bits from the signal line 213 match five bits of the prefetch address 110. Consequently, the five bits may also be deleted or ignored in the BWA 202. Two low-order bits of the signal line 213 indicate a position of the (two-byte long) branch instruction in the 8-byte instruction field thus prefetched and are used as control information of the prefetch queue 321.

Moreover, the valid bit 207 denotes whether or not information read from the entry is valid. The valid bit 207 is set to "1" or "0" when the information is valid or invalid, respectively. The valid signal is ANDed by the AND circuit 211 with the signal 210 representing the result of the matching comparison so as to produce the hit signal 212 indicating whether or not the data read from each of the BWA 202 and the BWD 203 is valid and hence is associated with the prefetch address 110.

The branch target address 106 read from the BWD 203 is used for the branch processing in the instruction prefetch unit. Namely, in FIG. 1, the branch target address 106 output from the buffer BW 102 is inputed as a prefetch address via the selector 109 and the signal line 110 to the instruction cache 104, the branch instruction buffer 102, and the prefetch address generator 101.

Furthermore, the branch instruction type 208 indicates that the branch instruction read from the entry is any one of an unconditional branch (bra) instruction, a subroutine call (bsr) instruction, and a return (rts) instruction. On receiving the information, the control circuit in the instruction prefetch unit executes one of the operations shown in FIGS. 4 to 6.

3.2 Configuration and Operation of Return Buffer RB

Figure 8:
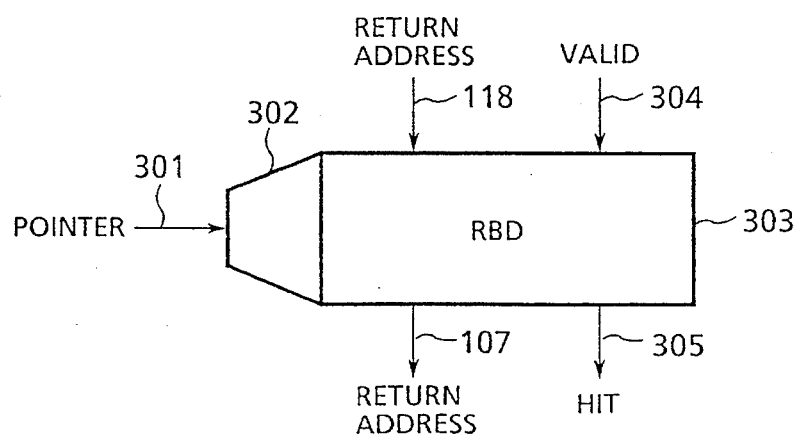
FIG. 8 is a diagram showing in detail the structure of the return buffer RB 103 in the microprocessor of FIG. 1.

FIG. 8 shows in detail the structure of the return buffer 103 of FIG. 1. The buffer 103 includes a decoder 302 and a random access memory RBD 303. The decoder is a 4-bit decoder and receives as an input thereto a 4-bit wide pointer to select one of 16 entries of the memory RBD 303. The memory RBD 303 includes 16 entries and is 32-bit wide. The 32 bits include a 31-bit return address (an input line 118, an output line 107) and a 1-bit valid bit (an input line 304, an output line 305). The obtained valid bit is used directly as a valid bit in the RBD 303.

The write operation of the return buffer RB 103 is as follows.

The 4-bit pointer 301 is supplied from the control circuit of the instruction prefetch unit. The pointer 301 is decoded by the decoder 302 to select one of the entries of the memory RBD 303. In this operation, the respective values of the return address 118 and the valid signal 304 input to the RBD 303 are written in the selected entry. The valid signal is delivered from the control circuit of the instruction prefetch unit. The write operation of data in the return buffer 103 is started when a subroutine call instruction (for example, the bsr instruction) is executed. The contents of the pointer is changed to indicate the next item in this operation.

The read operation of the buffer RB 103 is accomplished as follows.

As in the write operation, the 4-bit pointer 301 is delivered from the control circuit of the instruction prefetch unit. The pointer 301 is decoded by the decoder 302 to select one of the entries of the memory RBD 303. Data of the selected entry is simultaneously output onto the signal lines 107 and 305. When the type of the branch instruction read from the buffer BW 102 indicates a return (rts) instruction and the (valid) bit signal attained from the return buffer 103 denotes a value "1", the return address 107 is transferred as the next prefetch address via the selector 109 and the signal line 110 of FIG. 1 to the instruction cache 104, the branch instruction buffer 102, and the prefetch address generator 101. The contents of the pointer of the return buffer RB 103 are set to designate the previous item when the subroutine return (for example, the rts instruction) is executed.

In the processing of the subroutine return (rts) instruction, unlike in the case of the unconditional branch (bra) instruction and the subroutine call (bsr) instruction, the branch target address cannot be kept in the branch instruction buffer BW 102 for the following reason.

A return (rts) instruction is used to return control from the associated subroutine. Namely, as the final instruction of the subroutine, the instruction is executed to branch control from the subroutine to the instruction immediately following the call instruction having called the subroutine. The return address is saved in the stack when the subroutine is called and thereafter the address is restored therefrom when control is returned from the subroutine. Consequently, even for the same subroutine return (rts) instruction, the return address varies depending on the address of the routine which has called the subroutine.

In contrast thereto, in the branch instruction buffer BW 102, an address of the branch instruction and a branch target address are stored as a group constituting the history information. As described above, since the branch instruction address is not uniquely related to the branch target address in the subroutine return instruction, the branch return address of the subroutine return address cannot be kept in the buffer 102. To overcome this difficulty, there is disposed a buffer RB 103 for keeping therein a copy of the return address stored in the stack to obtain the return address from the buffer RB 103, thereby solving the problem.

4. Operation Flow

Figure 9:
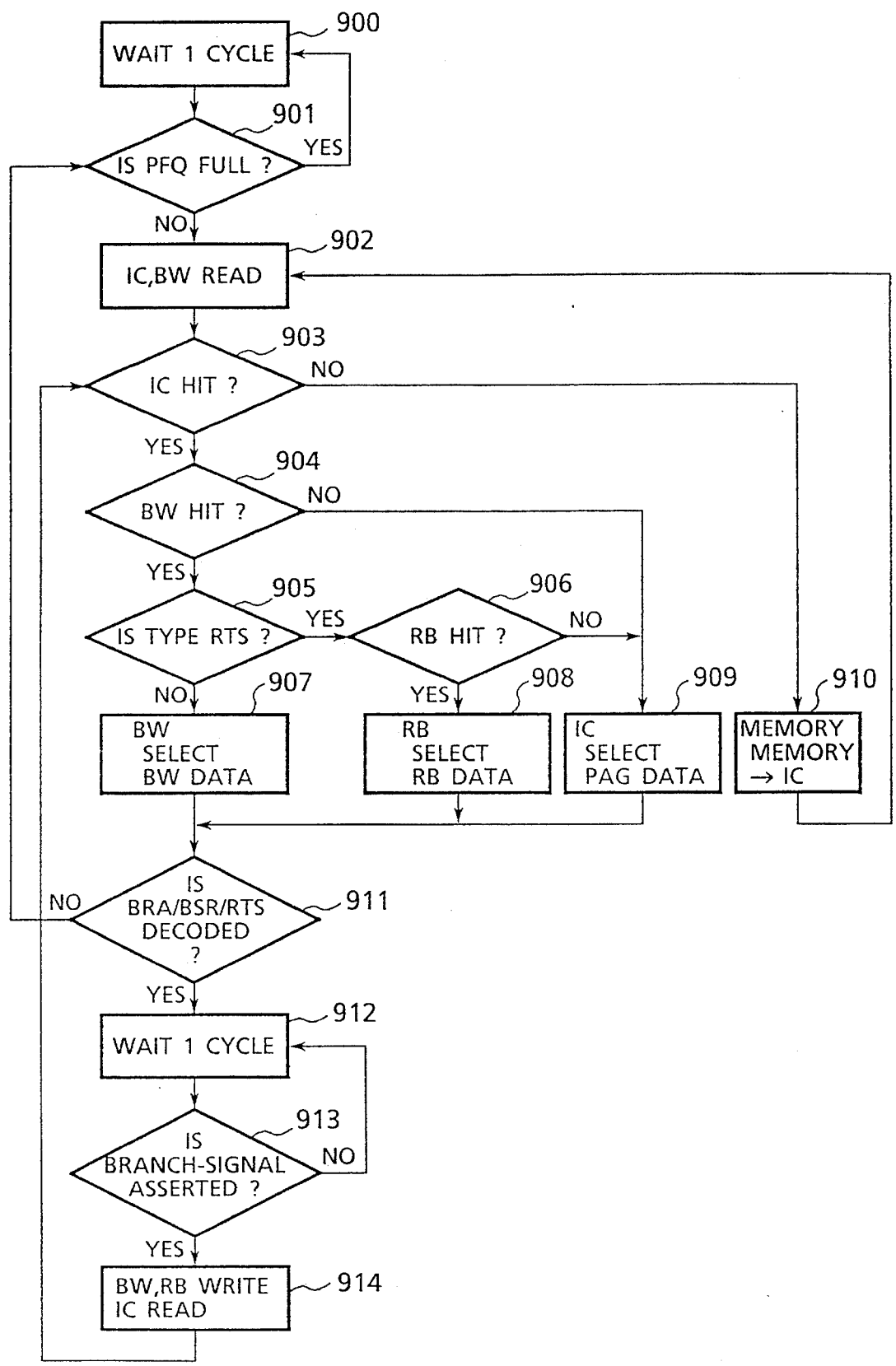
FIG. 9 is a flowchart showing the first portion of the control operation of an instruction prefetch unit of the microprocessor of FIG. 1.

FIG. 9 is a flowchart showing the basic control operation of the instruction prefetch unit of the data processor in the above embodiment. State transitions respectively associated with branches, reset operations, and occurrences of exception are not shown. The control flow will now be described with reference to FIG. 9.

In step 900, control waits for a free area in the prefetch queue PFQ 111. Since the queue 111 is an FIFO queue, when data is full therein, any subsequent data cannot be queued in the queue 111 until data is transferred therefrom to the instruction decoder 113 to resultantly provide a free area therein. Consequently, depending on the decision of step 901 (whether or not the PFQ 111 is full), control is passed to the wait step 900 or to step 902, respectively.

In step 902, a read operation is achieved on the instruction cache 104, the branch instruction buffer 102, and the return buffer 103. Results of the read operations are respectively examined in steps 903 to 906 to transfer control to one of the steps 907 to 910.

In step 903, it is determined whether or not the read operation on the instruction cache 104 has been successfully completed (the hit signal denotes a value "1"). If this is the case, control is passed to step 904; otherwise, the processing proceeds to step 910.

In step 904, the system determines whether or not the read operation on the buffer 102 has been successfully completed (i.e., whether or not the hit signal 212 of FIG. 7 indicates a value "1"). If this is the case, control is passed to step 905; otherwise, the processing proceeds to the step 909.

In step 905, a check is made to determine whether or not information of the branch instruction type (the signal 208 of FIG. 7) read from the buffer 102 designates a return (rts) instruction. If the type designates the return instruction, control is transferred to step 906; otherwise, the processing proceeds to a step 907.

In step 906, it is determined whether or not the read operation on the buffer 103 has been successfully completed (i.e., the hit signal 305 of FIG. 8 denotes a value "1"). If this is the case, control is passed to step 908; otherwise, the processing proceeds to step 909.

The step 907 is executed when a hit occurs in the buffer 102 and the branch instruction is an unconditional branch (bra) instruction or a subroutine call (bsr) routine. As a prefetch address in the subsequent cycle, there is employed the branch target address 106 output from the buffer 102. Specifically, the signal 106 is selected by the selector 109 of FIG. 1 so as to deliver the value of the signal to the signal line 110.

The step 908 is achieved when a hit occurs in each of the buffers 102 and 103 and the branch instruction is a return (rts) instruction. The return address 107 supplied from the buffer 103 is utilized as a prefetch address in the next cycle. Specifically, the signal 107 is selected by the selector 109 of FIG. 1 such that the value thereof is delivered to the signal line 110.

The step 909 is effected when a hit occurs in the cache 104 and the transition conditions respectively to the steps 907 and 908 are not satisfied. In step 909, a read operation is accomplished on the instruction cache 104. In this connection, as a prefetch address in the succeeding cycle, the value of the signal 105 sent from the generator 101 of FIG. 1 is used. More specifically, the signal 105 is selected by the selector 109 of FIG. 1 so as to deliver the value of the signal to the signal line 110.

The state transition to step 910 takes place when the read operation on the cache 104 results in a failure. In this step 910, a memory access is initiated to an external memory. The prefetch address (on the signal line 110) used to read data from the instruction cache 104 is adopted as an address to access the external memory. When the instruction transfer from the external memory is finished, control is again passed to step 902.

From each of the steps 907 to 909, the processing is transferred to step 911.

In step 911, it is decided whether or not a write operation is to be activated for the buffers 102 and 103. Basically, the decision is made according to decode information denoting that any one of the unconditional branch (bra) instruction, the subroutine call (bsr) instruction, and the return (rts) instruction has been decoded by the instruction decoder 113. However, the initiating condition of the write operation varies slightly between these branch instructions as follows.

(1) Unconditional Branch (bra) Instruction

When the bra instruction is decoded, if the buffers 102 and 103 are available, the write operation is activated for the buffer 102. When the instruction is associated with a branch using the buffer 102, the instruction is deleted or ignored in the instruction prefetch unit and hence is not transferred to the instruction decoder 113. Conversely, when the instruction is decoded, the instruction does not execute a branch operation utilizing the buffer 102.

(2) Subroutine Call (bsr) Instruction and the Return (rts) Instruction

In a case where a branch operation using the buffer 102 is achieved for one of these instructions, the instruction prefetch unit transfers a branch instruction via the signal line 112 to the instruction decoding unit 113 together with tag information designating that the branch instruction has already accomplished a branch operation by use of the buffer 102. Based on the tag information, for the branch instruction having conducted a branch via the buffer 102, the instruction decoder 113 prevents a branch directing signal and decode information, indicating that either one of the instructions above has been decoded, from being sent to the instruction prefetch unit.

If the write operation on the buffer 102 is to be initiated, control is passed to step 912; otherwise, the processing is transferred to step 901.

The step 912 conducts a wait operation for a branch directing signal. Whether or not the signal has been asserted is determined in step 913. In step 912, access is made to the instruction address queue 121 to output therefrom an address of the branch instruction onto the signal line 122. Moreover, there are generated the signals 204 and 205 of FIG. 7 to await assertion of the branch directing signal. When the signal is asserted, control is transferred to step 914.

In step 914, data is registered to the buffer 102. In the microprocessor of the embodiment of FIG. 1, the branch indicating signal and the branch target address are created at the same time. The address is produced from the ALU 117 of FIG. 1 to be transferred via the line 118 to the buffer 102. In the buffer 102, when the branch indicating signal is asserted, all input data items are arranged to be simultaneously written in the entries of the address tag field 202 and the data field 203 selected by the prefetch address 110. In this algorithm, the write operation on the buffer 102 and the read operation on the cache 104 are simultaneously accomplished in step 914. Consequently, while data is being written in the buffer 102, it is impossible to read data therefrom. However, the read and write operations on the buffer 102 can be simultaneously conducted by disposing two ports in the buffer 102.

When the write operation on the buffer 102 is completed in step 914, control is returned to step 903.

As set forth above, according to the embodiment of the present invention, in a branch processing procedure, the unconditional branch instruction can be executed at a high speed as shown in FIGS. 4 to 6 as follows.

1) There are retained branch history information including a branch instruction address and a branch target address such that a look-up operation of the history information is conducted according to a prefetch address. This enables a branch to be effected at an earlier stage of the processing.

2) The buffer BW (for keeping therein branch history information) and the buffer RB (for keeping therein a return address) are linked to each other in operation. This increases the speed of the branch processing for the return instruction.

3) Information of the type of the branch instruction is also kept in the buffer BW. This enables the linkage between the buffers BW and RB and makes it possible to accomplish a precise control operation for each branch instruction. For example, the information is used to achieve a control operation as follows. When processing an unconditional branch (bra) instruction, the execution of the instruction is deleted; whereas, when processing a subroutine call (bsr) instruction, the execution thereof is not deleted.

While particular embodiments of the invention have been shown and described, it will be obvious to those skilled in the art that various changes and modifications may be made without departing from the present invention in its broader aspects.

We claim:

1. A data processor comprising:

a prefetch address generator for generating a prefetch address;

a prefetch queue for prefetching an instruction from a memory according to the prefetch address and storing the instruction;

an instruction decoder for decoding the instruction stored in said prefetch queue;

an arithmetic logic unit(ALU), controlled by an output from said instruction decoder, for generating a branch target address of a branch instruction in accordance with an address calculation;

a first buffer having a plurality of entries each of which is for storing therein an address of the branch instruction input from said prefetch address generator, the branch target address of the branch instruction input from said ALU, and information input from said instruction decoder indicating a type of the branch instruction;

a second buffer having a plurality of entries each of which is for storing therein a return address, input from said ALU, for a return from a subroutine to a main processing routine; and a comparator for comparing the prefetch address with branch instruction addresses stored in said first buffer, wherein:

when matching between the prefetch address and the branch instruction address is detected by said comparator, if the type information read from said first buffer indicates that the instruction for which the matching is detected is a branch instruction rather than a return instruction for the return from the subroutine to the main processing routine, the branch target address is read from said first buffer; and when the matching between the prefetch address and the branch instruction address is detected by said comparator, if the type information read from said first buffer indicates that the instruction for which the matching is detected is a return instruction for a return from a subroutine to the main processing routine, the return address is always read from said second buffer.

2. A data processor according to claim 1, wherein said memory is a cache memory in which the instruction is stored from an external memory, the instruction being prefetched from said cache memory to said prefetch queue according to the prefetch address.

3. A data processor according to claim 2, wherein said prefetch queue, said instruction decoder, said arithmetic logic unit, said comparator, said first buffer, said second buffer and said cache memory are formed on a semiconductor chip of a microprocessor.

4. A data processor according to claim 3, wherein said prefetch queue, said instruction decoder, and said arithmetic logic unit conduct a pipeline operation.

5. A data processor according to claim 4, wherein said second buffer is a last-in first-out buffer.

* * * * *